United States Patent [19]

Bibaeff

[11] Patent Number: 4,800,025
[45] Date of Patent: Jan. 24, 1989

[54] APPARATUS AND PROCESS FOR THE GAS FLOTATION PURIFICATION OF OIL-CONTAMINATED WATER

[75] Inventor: John A. Bibaeff, Lafayette, La.

[73] Assignee: Pony Industries, Inc., New York, N.Y.

[21] Appl. No.: 898,293

[22] Filed: Aug. 20, 1986

[51] Int. Cl.[4] ................................................ C02F 1/24
[52] U.S. Cl. ...................................... 210/703; 210/744; 210/776; 210/221.2; 210/320
[58] Field of Search ................... 210/221.1, 221.2, 199, 210/259, 320, 703–706, 708, 744, 776; 209/164, 168, 170; 261/77, DIG. 75

[56] References Cited

U.S. PATENT DOCUMENTS

| 3,032,199 | 5/1962 | Sumiya | 209/170 |
| 3,784,468 | 1/1974 | Garcia | 210/261 |
| 4,021,347 | 5/1977 | Teller et al. | 210/220 |
| 4,094,783 | 6/1978 | Jackson | 210/703 |
| 4,162,972 | 7/1979 | Green | 210/221.2 |
| 4,220,612 | 9/1980 | Degner et al. | 261/DIG. 75 |
| 4,255,262 | 3/1981 | O'Cheskey et al. | 210/221.2 |
| 4,564,457 | 1/1986 | Cairo, Jr. et al. | 210/221.2 |
| 4,585,561 | 4/1986 | Zlokarnik et al. | 210/705 |
| 4,618,430 | 10/1986 | Favret, Jr. et al. | 210/703 |

FOREIGN PATENT DOCUMENTS

1411388 10/1975 United Kingdom .

Primary Examiner—Benoit Castel
Assistant Examiner—Richard D. Jordan
Attorney, Agent, or Firm—J. R. Magnone; A. J. Good

[57] ABSTRACT

Apparatus for the dispersed gas flotation and separation of insoluble, dispersed contaminants from a liquid comprised of a horizontal series of flotation cells, separated by baffles that permit the substantially horizontal flow of liquid from one cell to the next, each cell being equipped with one or more gas dispersing nozzles and screens which aid in the coalescence and flotation of the contaminant particles, and an inclined baffle above the horizontal series of cells to urge the floated impurities toward a weir positioned to remove the impurities from the surface of the liquid.

29 Claims, 6 Drawing Sheets

APPARATUS AND PROCESS FOR THE GAS FLOTATION PURIFICATION OF OIL-CONTAMINATED WATER

BACKGROUND OF THE INVENTION

1. Field of the Invention

This invention relates to apparatus and a process for the removal of insoluble substances from a liquid, and more particularly, to the purification of a liquid by the gas flotation of insoluble dispersed materials from the liquid.

2. General Background

Many industrial processes such as mining and oil recovery operations involve the treatment or handling of a liquid which contains contaminates such as fine suspended solid particles or globules of oil or other liquid substances which are immiscible in the liquid. Often, these contaminants must be removed prior to subsequent use or disposal of the liquid. For example, contaminants picked up in water used in the beneficiation of minerals must be removed from the water prior to its reuse or disposal. Similarly, water used in oil operations such as secondary recovery usually contains dispersed oil droplets which must be removed from the water prior to its reuse in the oil recovery operations or prior to its return to the environment.

Many systems have been devised for the removal of the above-described contaminants from liquids. For example, insoluble contaminants are often removed from liquids in large settling basins. This treatment is generally ineffective for the removal of finely suspended solids or insoluble liquid droplets. Other purification methods are based on filtration, but the high cost of purchasing and maintaining filtration equipment militates against the use of these techniques in most industrial operations. One of the most commonly used methods for the purification of liquids containing solids or immiscible liquids is gas flotation. Gas flotation involves the use of very small gas bubbles to agglomerate or coalesce the contaminant particles and float them to the surface of the liquid where they are separated from the liquid. The present invention employs an improved gas flotation method for the removal of suspended contaminants from liquids.

Prior Art

Several patent and literature references describe processes and equipment for the gas flotation purification of liquids. U.S. Pat. No. 2,766,203 discloses gas flotation water purification equipment comprised of several cells which are separated by foraminate baffles which permit the water being treated to pass from one cell to the next. Oil rising to the surface is removed with mechanical skimmers. U.S. Pat. No. 4,226,706 discloses air flotation apparatus comprised of a horizontal series of cells separated by solid walls. Water passing from one cell to the next must move downwardly to an opening near the bottom of the walls separating the cells. U.S. Pat. No. 3,784,468 discloses apparatus for separating liquids of different densities by gas flotation comprised of a series of flotation cells. The liquid being treated is pumped from the bottom of one cell to a liquid-gas cyclone and then into the next cell and the lighter liquid spills over a weir located at the top of the cells. U.S. Pat. No. 4,564,457 discloses an air flotation apparatus for the separation of water and oil comprised of a horizontal cylindrical vessel containing a series of aeration chambers each equipped with a gas eductor. The treated water moves beneath vertical baffles to pass from one chamber to the next. A horizontal trough for skimming oil from the liquid surface extends the length of the cylindrical vessel at the top of the vessel. U.S. Pat. No. 3,853,753 discloses an apparatus for removing dispersed oil from water comprised of a vertical cylindrical tank. The apparatus includes an upwardly inclined baffle to direct the rising water-oil mixture to one side of the cylinder. U.S. Pat. No. 3,525,437 describes gas flotation apparatus for separating solids from liquids which includes a mesh to reduce turbulence and flow speed. Other U.S. Patents which show the use of inclined baffles for directing liquid or solid flow in separation vessels are 3,769,207; 3,893,918; 4,372,757; and 4,428,841. U.S. Pat. Nos. 3,175,687 and 4,110,210 show the use of various nozzles for introducing gas-liquid mixtures into gas flotation liquid purification equipment. Other U.S. Patents which disclose gas flotation equipment and processes are 3,576,738; 3,616,919; 3,725,264; 3,849,311; 3,932,282; 4,086,160; 4,198,300; 4,251,361; and 4,399,028.

The apparatus of the present invention provides improved separation of insoluble or immiscible contaminants from a liquid relative to the operation of the abovedescribed equipment by effecting improved contact between gas bubbles and contaminants contained in the liquid being purified and by eliminating the use of mechanical skimmers for the removal of floated contaminants.

OBJECTS OF THE INVENTION

It is an object of the invention to present improved apparatus for the removal of fine suspended contaminants from a liquid. It is another object of the invention to present gas flotation equipment that more efficiently separates suspended contaminants from a liquid. It is another object of the invention to present gas flotation apparatus which provides for more efficient removal of floated contaminants from the surface of a liquid. It is another object of the invention to present gas flotation equipment which provides more efficient contact between the dispersed gas bubbles and contaminants being separated from a liquid. It is another object of the invention to present an improved process for the removal of contaminants from a liquid. It is another object of the invention to present an improved process and apparatus for the gas flotation purification of oil contaminated water. These and other objects of the invention are supported in the following description and drawings of the invention.

SUMMARY OF THE INVENTION

The improved gas flotation apparatus of the invention is comprised of an elongate vessel containing a horizontal series of gas flotation cells which are separated by partition walls which have openings to permit substantially horizontal flow of liquid passing from one cell to the next. The horizontal cells each contain a screen and two gas eductors, one located on each side of the screen. The screen serves to improve contact between the gas bubbles being emitted from the eductors and the contaminants which are suspended in the liquid being treated.

The location of the openings may be on alternate sides of the vessel in adjacent partition walls to extend the path of liquid flow through the flotation apparatus.

Alternatively, the partition wall openings may all be on the same side of the vessel and the screens may have cutouts on the edges which are on the side which is opposite to the side on which the partition wal cutouts are located.

The tops of the cells are closed off by baffling which inclines in a slightly upward direction from the sidewall to an overflow weir, the baffling serving to direct contaminant-containing froth to the weir for removal of the contaminants from the flotation cells.

DETAILED DESCRIPTION OF THE PREFERRED EMBODIMENTS

The gas flotation apparatus of the invention can, in general, be used to clarify a liquid by the removal of most fine suspended solids or droplets of insoluble liquids from the liquid. However, for purposes of simplification and without any intent to limit the scope of the invention, the gas flotation apparatus and process of the invention will be described with particular reference to the removal of oil contaminants from water.

Figure 6:
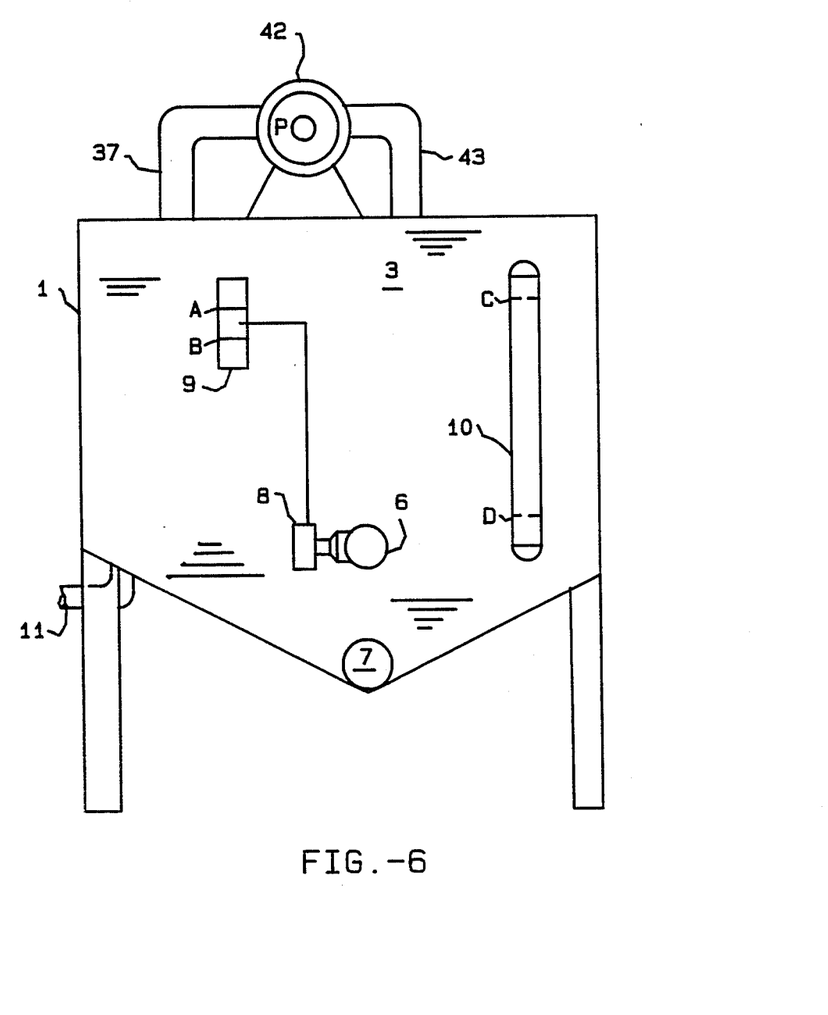
FIG. 6 is an elevation of the clean liquid discharge end of the gas flotation apparatus of the invention.

Referring now to FIGS. 1-3 and 6, the gas flotation apparatus of the invention is comprised of a generally elongate vessel 1 having an inlet end wall 2 and an outlet end wall 3. Inlet end wall 2 is fitted with an oil-contaminated water inlet 4 and clean-out line 5 for flushing sand and other debris from the bottom of the gas flotation apparatus. Outlet end wall 3 is fitted with a clean water outlet 6 and a clean-out line 7. A motor-driven valve 8 which is actuated by liquid level control device 9 is attached to and controls the amount of water flowing through clean water outlet 6 to maintain the liquid level in vessel 1 between points A and B (FIG. 6).

Also attached to outlet end wall 3 is a high level-low level shut-off device 10 which shuts down the gas flotation unit if the liquid level in vessel 1 rises to level C or falls to level D. Vessel 1 is also fitted with oil outlet 11 from which oil which has been separated from the water being treated is removed from vessel 1.

Figure 4:
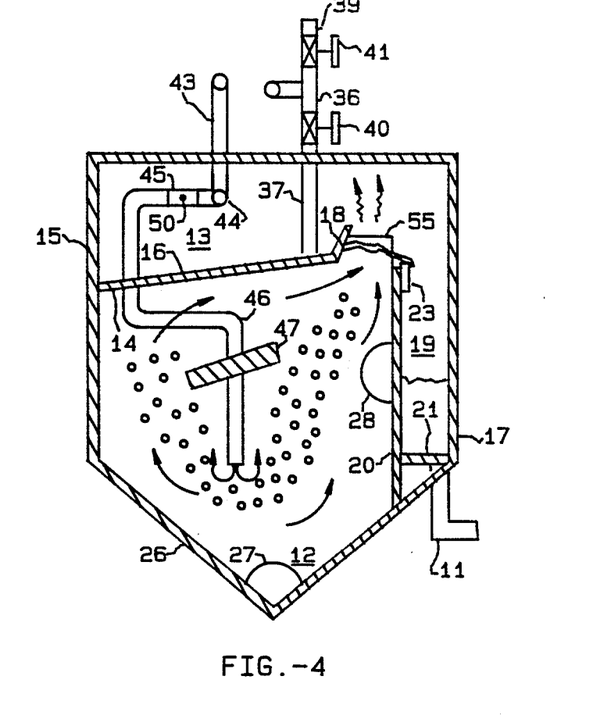
FIG. 4 is a cross section taken along the line 4—4 of FIG. 2 illustrating the flow of liquid and gas during operation of the gas flotation apparatus of the invention.
Figure 5:
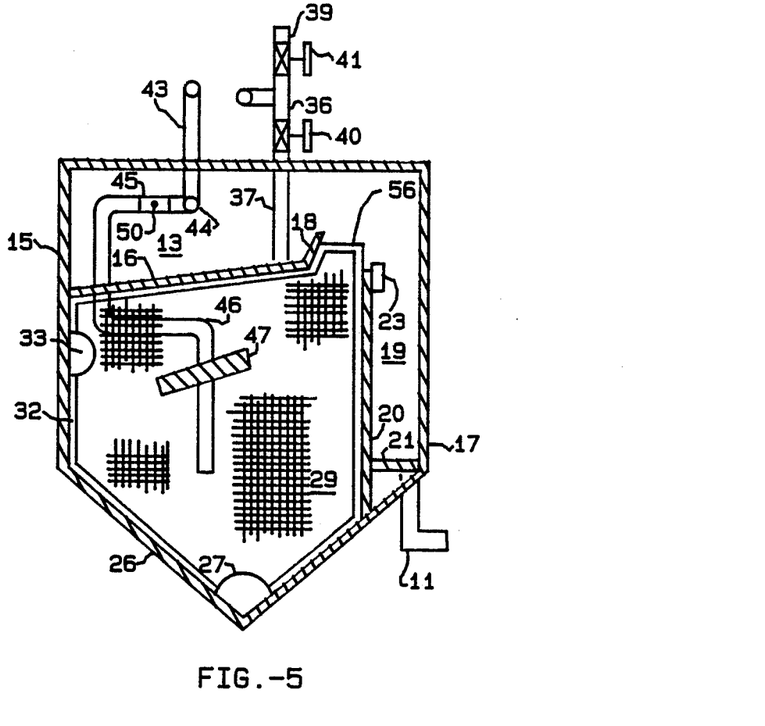
FIG. 5 is a cross section taken along the line 5—5 of FIG. 2 illustrating the arrangement of one of the screens in the gas flotation apparatus of the invention.

Internally, vessel 1 is comprised of a liquid flow region 12, which occupies the lower part of vessel 1, and a gas collection region 13, which is located above liquid flow region 12. As best seen in FIGS. 4 and 5, liquid flow region 12 and gas collection region 13 are separated by baffle means 14, which extends horizontally in a longitudinal direction from inlet end wall 2 to outlet end wall 3. Baffle means 14 sealingly engages inlet end wall 2, outlet end wall 3, and rear wall 15. In the embodiment illustrated in FIGS. 1-5, baffle means 14 consists of a flat section 16 which extends transversely in a slightly upward direction towards front wall 17 and a flange 18 which projects upwardly from the upper end of flat section 16. Oil recovery trough 19 is located along front wall 17 and is separated from liquid flow region 12 by partitions 20 and 21 which extend to and are sealingly attached to inlet end wall 2 and outlet end wall 3. Trough 19 is in communication with gas collection region 13 through its open top. Opening 22 communicates with oil outlet 11 and trough 19 and serves to permit removal of oil from trough 19. An adjustable overflow weir 23 is mounted to the top of partition 20.

Liquid flow region 12 is divided into a battery of flotation cells 24 which are separated by vertical partition walls 25. Partition walls 25 extend transversely across vessel 1 and are sealingly attached to rear wall 15, partition 20, and vessel bottom 26. Each partition wall 25 has a bottom cutout 27 to facilitate the cleaning of vessel 1. Partition walls 25 also have cutouts 28 which provide communication between adjacent flotation cells 24. Cutouts 28 are positioned and shaped to provide substantially horizontal flow of the contaminated water from one flotation cell to the next.

Figure 9A:
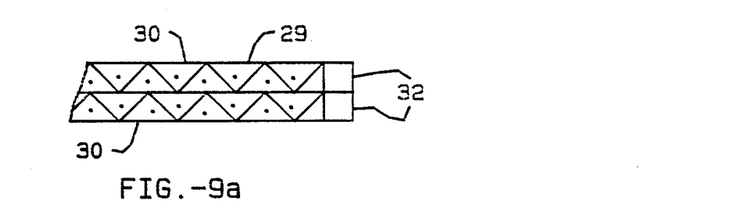
FIG. 9a is an exploded fragmentary view in section showing one embodiment of the screen means of FIG. 8 in which two screens are fastened together in contiguous relationship.
Figure 9B:
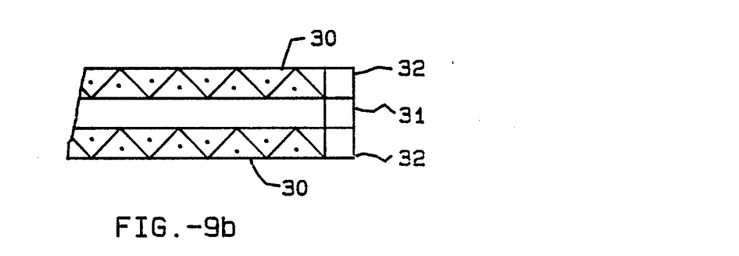
FIG. 9b is an exploded fragmentary view in section showing an alternate embodiment of the screen means of FIG. 8 in which two screens are separated by spacers.

Each flotation cell 24 is provided with a screen means 29 which is desirably positioned vertically and transversely of vessel 1 in a plane substantially parallel to the plane of partition walls 25. In the embodiment illustrated in the drawings, the screen means divides each flotation cell into two chambers. Screen means 29 may be comprised of a single screen 30 or two or more screens 30 fastened with the flat surfaces of each screen in direct contact with each other (FIG. 9a). Alternatively, screens 30 may be separated by spacers 31 (FIG. 9b). Screens 30 may be fastened to frames 32, which impart rigidity to the screen means. When two or more screens are fastened together, the openings of adjacent screens may be aligned or they may be offset to provide a slight baffling effect. Screen means 29 may optionally have cutouts 33 to direct some of the flow of contaminated water around the edges of screen means 29. Screen means 29 are also preferably fitted with openings 34 at the lower-most point to facilitate cleaning of vessel 1.

Gas is introduced into the flotation cells by being dispersed in a stream of water supplied through conduit 35. Conduit 35 communicates with the lower portion of the liquid flow region, preferably in the vicinity of the outlet end wall 3, via tee 36 and conduit 37 which has an open end 38. Tee 36 also connects to conduit 39 which is connected to a clean water supply. Conduits 37 and 39 are fitted with shutoff valves 40 and 41 respectively. Conduit 35 is connected to the suction end of a pump 42, which discharges via conduit 43 into manifold header 44. Header 44 communicates with gas eductors 45. Gas eductors 45 in turn communicate with gas dispersion conduits 46. Gas dispersion conduits 46 have open ends which communicate with the lower portion of flotation cells 24. In the embodiment illustrated in FIGS. 1–3, two gas dispersion conduits are provided for each flotation cell, one located on each side of screen means 29, i.e., one gas dispersion conduit is located in each chamber of each cell. A baffle plate 47 may optionally be positioned near each gas dispersion conduit to further disperse gas bubbles being emitted from gas dispersion conduits 46.

Figure 10A:
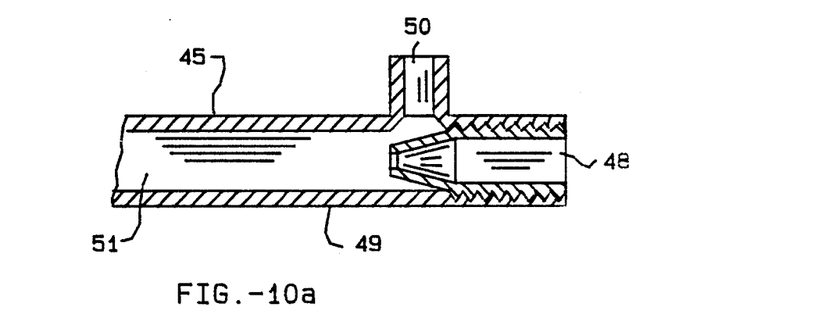
FIG. 10a is a cross sectional view of one embodiment of a gas eductor which is useable in the invention.
Figure 10B:
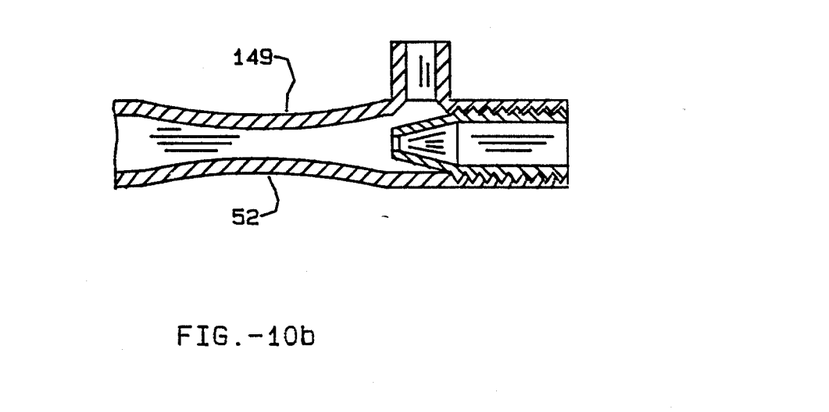
FIG. 10b is a cross sectional view of an alternate form of gas eductor useable in the invention.

As shown in FIG. 10a, gas eductors 45 have water inlets 48 removably threaded into tube 49 and gas inlet ports 50 which are open and in communication with gas regon 13. Eductor outlet 51 is connected to gas dispersion conduit 46. FIG. 10b illustrates an alternate embodiment of the gas eductor which is similar to the device illustrated in FIG. 10a except that tube 149 has a narrowed throat 52.

In operation, oil-contaminated water enters the first chamber of the first flotation cell of vessel 1 through inlet 4 and slowly moves through the cell toward screen means 29 which devices the cell into two chambers. In the first chamber, the contaminated water is continuously contacted by fine gas bubbles which enter the cell through gas dispersion inlet 46. The gas bubbles, which are finely dispersed, contact and adhere to the oil droplets in the contaminated water, thereby increasing the buoyancy of the oil droplets and causing them to rise toward the surface of the water in the cells. The water being treated enters the second chamber of the first flotation cell by passing through screen means 29 or around the screen means via cutout 33. The amount of water passing around the screen means is determined by the size of the screen openings and the size of screen cutout 33. The relative amount of water passing through cutout 33 determines the residence time in the cell. It is desirable to maintain a sufficient residence period to permit enough oil contaminant to be removed from the water in the flotation apparatus to lower the oil content to below the maximum amounts permitted under the pertinent environmental regulations. However, it is also important that the screen openings and the screen cutouts be large enough to avoid the creation of a pressure differential across the screen means. Although the screen mesh size is not critical, it is preferred that the screens used in the screen means have a mesh size of about one one-hundredth (1/100) inch to about one-fourth (¼) inch. It should be understood that the screen cutouts are optional. They are not necessary if the residence time of the contaminated water in the flotation apparatus is sufficient to effect the desired degree of water purification. It can be appreciated that one of the functions of the screen means is to help reduce turbulence in the flotation cells. It is not known for certain, but it is believed that the screen means also helps to coalesce the oil droplets.

In the second chamber of the first flotation cell, the contaminated water is again contacted with gas bubbles, which are emitted from the second gas dispersion inlet. As the water passes through the second chamber of the first cell, it approaches the cutout in the partition wall separating the first and second flotation cells. In the embodiment in which the screen means are provided with cutouts, it is desirable that the screen cutouts and the partition wall cutouts be on opposite sides of the flotation apparatus. This will enable the contaminated water to follow a serpentine path through the apparatus and will ensure that the maximum amount of contaminated water is contacted with the dispersed gas bubbles. If the screens contain no cutouts, it is preferable that the cutouts of adjacent partition walls be located on opposite sides to avoid channeling of the water along one sidewall of the flotation apparatus. The gas-contaminated water contact process described above is repeated in the second and each subsequent flotation cell.

Partition wall cutouts 28 are designed to permit contaminated water to move from cell to cell in a substantially horizontal path. This is the preferred path of movement since it does not hinder the upward movement of the oil droplets. Cutouts 28 are of sufficient size to allow the water to pass from cell to cell without creating turbulence. Since additional water is added to the system through gas dispersion conduits 46, it may be desirable to increase the size of cutouts 28 (and, if desired, screen cutouts 33) as the distances between the flotation apparatus inlet end and the partition walls increases. In other words, the cutouts in the partition walls and screens closest to the outlet end of the apparatus may be larger than those closest to the inlet end of the apparatus.

Figure 7A:
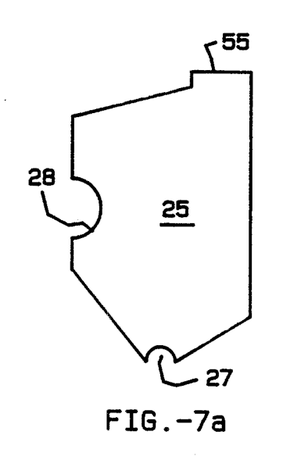
FIG. 7a is a view of one form of cell partition wall useable in the gas flotation apparatus of the invention.
Figure 7B:
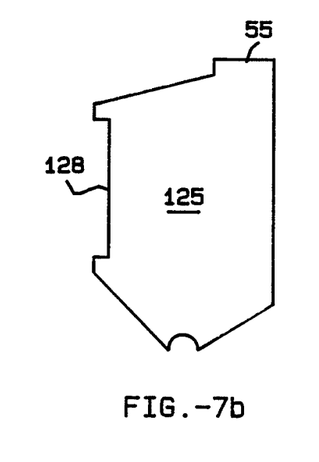
FIG. 7b depicts an alternate form of a cell partition wall.
Figure 8:
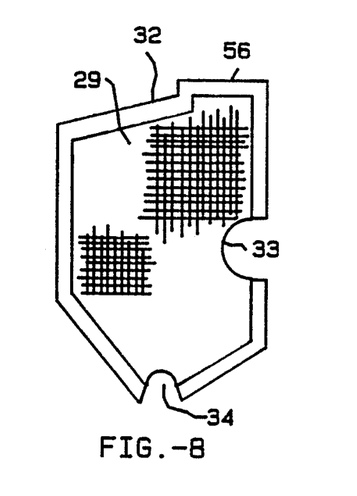
FIG. 8 illustrates one embodiment of a screen which is useable in the apparatus of the invention.

The shapes of partition wall and screen cutouts 28 and 33 are not critical. Cutouts 28 and 33 are depicted as semicircular in FIGS. 1–5, 7a, and 8, but these cutouts can have other shapes. FIG. 7b shows an alternate embodiment of a partition wall 125 having an elongated rectangular cutout 128 along one side edge. In some installations, an elongated rectangular cutout shape may be preferable to the semicircular cutout shape since it can facilitate a more uniformly horizontal movement of the contaminated water passing from cell to cell. Cutouts 33 may also have rectangular shapes.

The gas may be introduced into the flotation cells by any suitable means. It is preferably introduced into the flotation cells in the form of a dispersion of tiny gas bubbles in relatively clean water. It is convenient to use the substantially oil-free water that has been processed in the apparatus of the invention. Water obtained from the lower part of the last flotation cell is preferred since this is the cleanest water in the flotation apparatus. When water from the gas flotation flotation apparatus is used, valve 40 is open and valve 41 is closed. If it is desired to use an alternate source of water for gas dispersion, such as fresh sea water, valve 41 is opened and valve 40 is closed. Water entering the gas dispersion system is drawn through conduit 35 by pump 42. Pump 42 may be any suitable type of pump. Pump 42 discharges water via conduit 43 into manifold header 44 which in turn feeds water to gas eductor 45. The pressure of the water entering the eductors is preferably in the range of about 25 to 75 psig.

Any type of eductor which entrains a gas into a liquid can be used in the apparatus of the invention. FIGS. 10a and 10b illustrate typical gas eductors. In the embodiment shown in FIG. 10a, water enters the eductors through eductor water inlet 48. As it passes through nozzle 53, the force of the water creates a low pressure region 54. The low pressure in region 54 causes gas to be drawn from gas collection region 13 into eductor 45 through gas inlet 50. The gas and water mix in low pressure region 54 with sufficient turbulence to form a dispersion of fine bubbles in the water. The dispersed gas is carried via conduits 46 into the flotation cells, where it mixes with the contaminated water being treated. The pressure in vessel 1 is generally atomspheric.

As the gas bubbles rise in flotation cells 24, they contact and attach themselves to the oil droplets contained in the feedwater. The oil droplets are carried to the top of the cells by the added buoyancy imparted to the droplets by the gas bubbles. The flow pattern of the gas and oil is most clearly shown in FIG. 4. As the floated oil droplets reach the top of flotation cells 24, they are forced across the top of the cell along inclined baffle 14 until they reach the open area between flange 18 and overflow weir 23. In the open area, the gas bubbles are released from the oil and return to gas region 13. The oil is guided toward overflow weir 23 by partition wall top sections 55 and screen wall top sections 56. The separated oil is forced over weir 23 and into oil recovery trough 19, from which it is removed from the flotation apparatus through outlet 22 and conduit 11. As can be appreciated, the inclined baffle 14 eliminates the need for mechanical or suction skimmers to remove oil from the flotation apparatus.

As noted above, the water level in vessel 1 is maintained between points A and B by liquid level controller 9. The water level can be adjusted to provide the most efficient operation. It is important that the water be maintained below overflow weir 23 to prevent water from being carried over into oil recovery trough 19. The water level is presented from reaching the top of weir 23 by high level-low level shut-off device 10 which shuts the unit off if the water level reaches point C. Point C is, of course, located below weir 23. Shut-off device 10 also shuts the unit down if the water level drops to point D, thereby preventing oil from flowing through clean water outlet 6.

Figure 11:
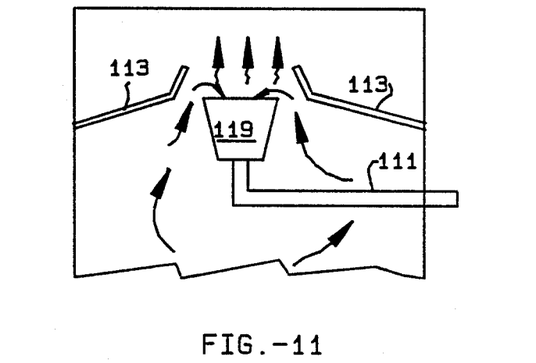
FIG. 11 illustrates an alternate form of the inclined baffling and oil collecting trough shown in FIG. 4.

The inclined baffle 14 can have a different arrangement from the embodiment illustrated in FIGS. 4 and 5. FIG. 11 shows one alternate inclined baffle arrangement. In this embodiment, there are two inclined baffles 113 which incline upwardly toward the center of vessel 1. Oil recovery trough 119 is located between baffles 113. Oil is pushed transversely up the lower surfaces of baffles 113 and flows into trough 119 from which it is removed from the gas flotation apparatus through conduit 111.

Figure 1:
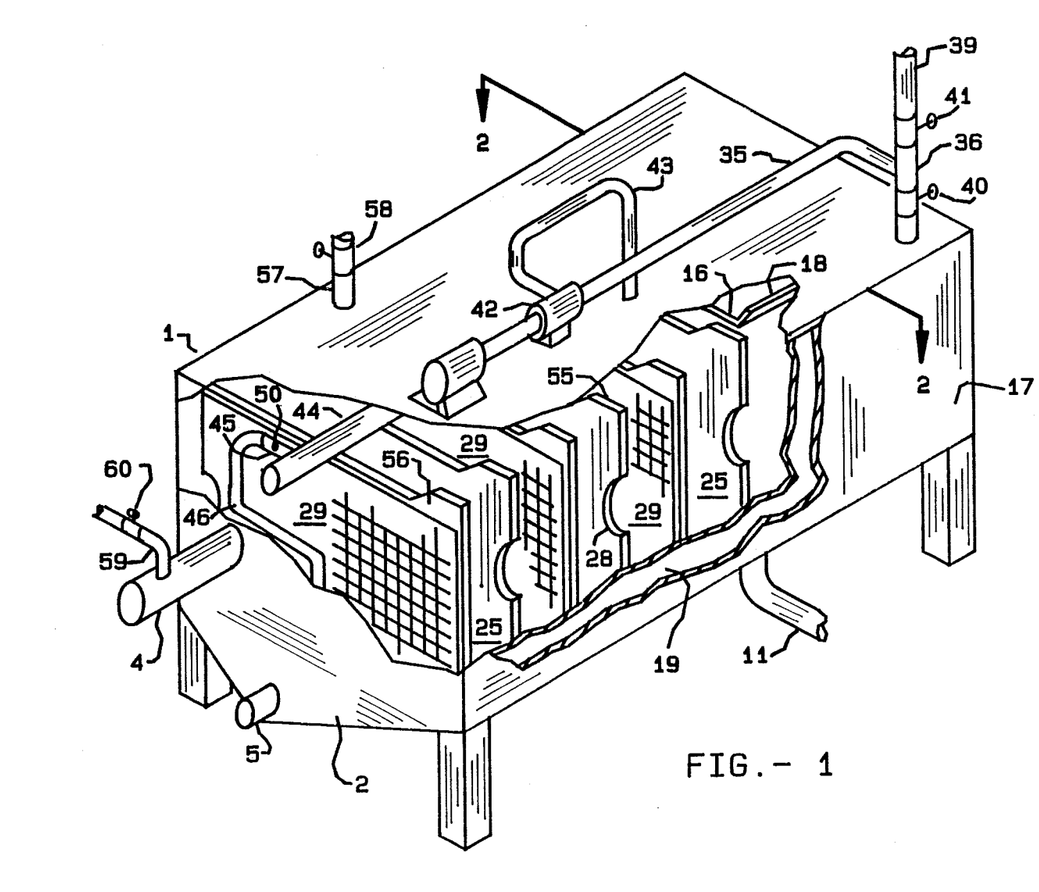
FIG. 1 is a partially cut away view in perspective of the gas flotation apparatus of the invention.
Figure 2:
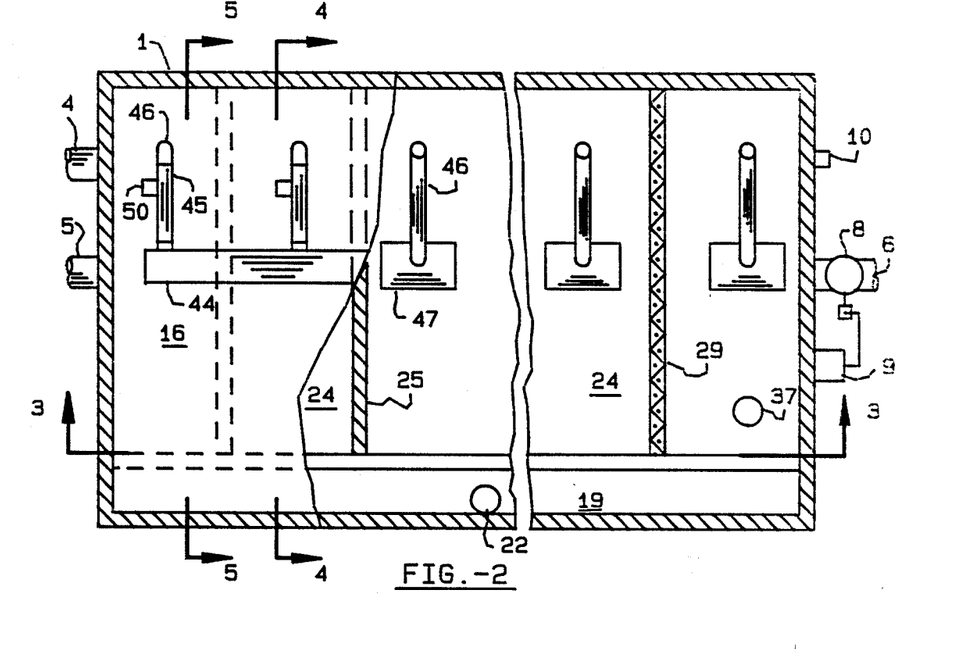
FIG. 2 is a fragmentary plan view in partial cross section taken along the line 2—2 of FIG. 1.
Figure 3:
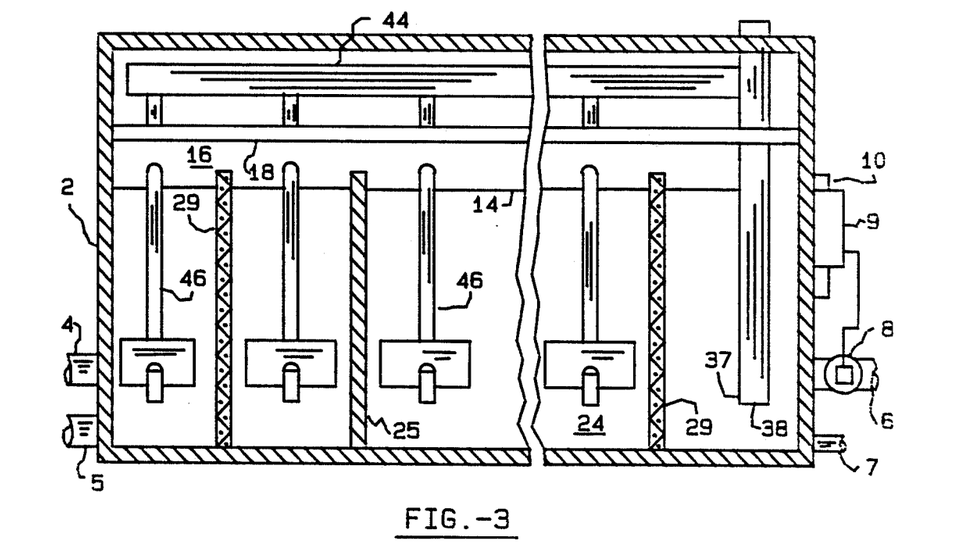
FIG. 3 is a fragmentary side elevation along the line 3—3 of FIG. 2.

Any suitable gas can be used in the operation of the apparatus of the invention. Suitable gases include natural gas, nitrogen, and air. It is generally convenient and preferred to use natural gas. The gas is charged into vessel 1 through line 57, which is fitted with a stop valve 58 (FIG. 1).

For some operations, it may be preferred to inject a flocculating agent into the contaminated water entering vessel 1. Line 59, fitted with valve 60, is provided for this purpose.

Although the invention has been described with particular reference to specific embodiments, it is understood that alternate embodiments which are not illustrated are contemplated. For example, two or more screen means may be placed in each flotation cell. Also, different gas dispersion means can be used. For instance, a single gas eductor may be used to supply dispersed gas to two or more gas dispersion conduits 46. The scope of the invention is limited only by the breadth of the appended claims.

What is claimed is:

1. A dispersed gas flotation apparatus useful for separating insoluble impurities from a liquid comprising:

(a) an elongate closed flotation vessel having an inlet end, an outlet end, a front sidewall, and a rear sidewall and defining a lower liquid flow zone and an upper gas collection zone, the direction from said inlet end to said outlet end defining a longitudinal direction, (b) means for introducing a liquid contaminated with insoluble impurities into the inlet end of the vessel, (c) means for removing at least partially decontaminated liquid from the outlet end of the vessel, (d) at least one vertical baffle means disposed in said liquid flow zone substantially normal to said longitudinal direction for dividing said liquid flow zone into a plurality of flotation cells, said baffle means being substantially impervious to flow of said liquid except for a cutout adjacent one of said front and rear sidewalls for affording communication between adjacent flotation cells, thereby permitting said liquid to flow between said flotation cells, (e) vertical screen means disposed in at least one flotation cell in a substantially parallel plane relative to said vertical baffle means, said screen means being adapted to aid in the separation of said insoluble impurities from said liquid, (f) gas introduction means for introducing gas bubbles into an interior of at least one flotation cell, said gas bubbles rising upwardly through said liquid and contacting the insoluble impurities, (g) contaminant collection means disposed longitudinally and horizontally in said vessel above said vertical baffle means and said screen means, and (h) means communicating with said contaminant collection means for removing contaminants from said vessel;

wherein said cutout is positioned in said baffle means at a location minimizing a downward flow of liquid opposite said upward direction of said rising gas bubbles.

2. The gas flotation apparatus of claim 1 wherein each cell contains at least one screen means.

3. The gas flotation apparatus of claim 2 wherein gas introduction means is provided on each side of each screen means.

4. The gas flotation apparatus of any one of claims 1, 2, or 3 wherein said gas introduction means includes means for providing a dispersion of gas in liquid to said flotation cells.

5. The gas flotation apparatus of claim 4 wherein said gas introduction means comprises gas eductors.

6. The gas flotation apparatus of claim 5 wherein said gas eductors includes means for receiving gas from said gas collection zone.

7. The gas flotation apparatus of claim 6 wherein said gas eductors includes means for receiving liquid from said outlet end of said vessel.

8. The gas flotation apparatus of any one of claims 1, 2, or 3 wherein said upper gas collection zone and said lower liquid zone are separated by an inclined baffle means which inclines upwardly toward said contaminant collection means.

9. The gas flotation apparatus of claim 8 wherein said contaminant collection means is positioned centrally above said flotation cells and said inclined baffle means comprises two baffle plates which incline upwardly toward said contaminant collection means.

10. The gas flotation apparatus of claim 8 wherein said contaminant collection means comprises a weir positioned along said front sidewall.

11. The gas flotation apparatus of claim 10 wherein a lower edge of said inclined baffle means sealingly engages said rear sidewall.

12. The gas flotation apparatus of claim 8 further comprising screen means in each flotation cell positioned to aid dispersion of gas bubbles being introduced into each cell.

13. The gas flotation apparatus of claim 1, wherein said apparatus includes a plurality of vertical baffle means, and wherein the cutouts in said plurality of vertical baffle means are located adjacent said front and rear sidewalls in alternating fashion, thereby producing a serpentine flow path for said liquid.

14. The gas flotation apparatus of claim 1, wherein said screen means includes a cutout positioned adjacent a sidewall different from the sidewall to which said vertical baffle means cutout is adjacent, thereby producing a serpentine flow path for at least a portion of said liquid flowing through both said cutouts in said screen means and said vertical baffle means.

15. The gas flotation apparatus of claim 14, wherein said apparatus includes a plurality of vertical baffle means, a screen means being positioned between adjacent vertical baffle means, and wherein each of said vertical baffle means has a cutout positioned adjacent the same sidewall.

16. The gas flotation apparatus of claim 15, wherein said apparatus includes a plurality of screen means, and wherein each of said screen means has a cutout positioned adjacent the same sidewall.

17. A dispersed gas flotation apparatus useful for separating insoluble impurities from a liquid comprising:
(a) an elongate closed flotation vessel having an inlet end, an outlet end, a front sidewall, and a rear sidewall and defining a lower liquid flow zone and an upper gas collection zone, the direction from said inlet end to said outlet end defining a longitudinal direction,
(b) means for introducing a liquid contaminated with insoluble impurities into the inlet end of the vessel,
(c) means for removing at least partially decontaminated liquid from the outlet end of the vessel,
(d) at least one vertical baffle means disposed in said liquid flow zone substantially normal to said longitudinal direction for dividing said liquid flow zone into a plurality of flotation cells, said baffle means being substantially impervious to flow of said liquid except for a cutout adjacent one of said front and rear sidewalls for affording communication between adjacent flotation cells, thereby permitting said liquid to flow between said flotation cells,
(e) gas introduction means for introducing gas bubbles into an interior of at least one flotation cell, said gas bubbles rising upwardly through said liquid,
(f) contaminant collection means disposed longitudinally and horizontally in said vessel above said vertical baffle means,
(g) an inclined baffle means extending from said inlet end to said outlet end which separates said upper gas collection zone and said lower liquid zone and which inclines upwardly toward said contaminant collection means, and
(h) means communicating with said contaminant collection means for removing contaminants from said vessel.

18. The gas flotation apparatus of claim 17 wherein said gas introduction means includes means for providing a dispersion of gas in liquid to said flotation cells.

19. The gas flotation apparatus of claim 18 wherein said gas introduction means comprises gas eductors.

20. The gas flotation apparatus of claim 19 wherein said gas eductors include means for receiving gas from said gas collection zone.

21. The gas flotation apparatus of claim 20 wherein said gas eductors include means for receiving liquid from said outlet end of said vessel.

22. The gas flotation apparatus of claim 17 wherein said contaminant collection means is positioned centrally above said flotation cells and said inclined baffle means comprises two baffle plates which incline upwardly toward said contaminant collection means.

23. The gas flotation apparatus of claim 17 wherein said contaminant collection means comprises a weir positioned along said front sidewall.

24. The gas flotation apparatus of claim 23 wherein a lower edge of said inclined baffle means sealingly engages said rear sidewall.

25. The gas flotation apparatus of claim 17 further comprising baffle means in each flotation cell positioned to aid dispersion of gas bubbles being introduced into each cell.

26. A method of separating oil contaminants from a liquid, comprising:
(a) introducing a stream of oil-contaminated liquid into an elongate vessel containing:
(i) a plurality of cells arranged in a horizontal series, said cells being separated by solid baffle means which permit the oil-contaminated liquid to flow from one cell to the next in a substantially horizontal path, said baffle means being substantially impervious to flow of said liquid except for a cutout adjacent one of a front and a rear sidewall thereof,
(ii) screen means disposed in at least one of said cells in a position such that at least part of said oil-contaminated stream passes through meshes of said screen means,
(iii) gas educting means in at least one of said cells,
(iv) oil-contaminant collection means disposed horizontally above an upper level of the liquid in said cells,
(v) contaminated liquid inlet means for introducing said oil-contaminated liquid into a first cell of said series,
(vi) liquid removal means for removing at least partially oil-decontaminated liquid from a last cell of said series,
(vii) oil removal means for removing oil contaminant from said oil contaminant collection means;
(b) contacting said oil-contaminated liquid with gas bubbles introduced into said vessel through said gas educting means thereby facilitating the release of oil contaminants from said oil-contaminated liquid;
(c) collecting released oil contaminant in said oil contaminant collection means;
(d) withdrawing oil from said vessel through said oil removal means; and
(d) withdrawing at least partially oil-decontaminated liquid from said vessel through said liquid removal means.

27. The method of claim 26 wherein gas is introduced into said cells in the form of a dispersion in water.

28. The method of claim 27 wherein the water used to form said dispersion is at least partially oil-decontaminated water which has been withdrawn from said vessel.

29. The method of claims 26, 27, or 28 wherein oil rising to a top of each cell is urged toward said oil contaminant collection means by an inclined solid baffle disposed above said cells.

* * * * *